(12) United States Patent
Leip (10) Patent No.: US 10,264,169 B2
(45) Date of Patent: Apr. 16, 2019

(54) SYSTEM TO SYNCHRONIZE FLASHES BETWEEN MOBILE DEVICES

(71) Applicant: Intel Corporation, Santa Clara, CA (US)

(72) Inventor: Terrence P. Leip, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/081,115

(22) Filed: Mar. 25, 2016

(65) Prior Publication Data

US 2017/0280030 A1    Sep. 28, 2017

(51) Int. Cl.
| | |
|---|---|
| *H04N 5/225* | (2006.01) |
| *H04N 5/232* | (2006.01) |
| *H04W 8/00* | (2009.01) |
| *H04W 4/80* | (2018.01) |
| *H04W 76/14* | (2018.01) |

(52) U.S. Cl.
CPC ....... *H04N 5/2256* (2013.01); *H04N 5/23206* (2013.01); *H04W 4/80* (2018.02); *H04W 8/005* (2013.01); *H04W 76/14* (2018.02)

(58) Field of Classification Search
CPC ... H04N 5/2256; H04N 5/2257; H04W 4/008; H04W 8/005; H04W 76/023
See application file for complete search history.

(56) References Cited

U.S. PATENT DOCUMENTS

| | | | |
|---|---|---|---|
| 2010/0134679 A1 | 6/2010 | Lin | |
| 2012/0044371 A1* | 2/2012 | King | H04N 5/2256 348/211.2 |
| 2014/0293013 A1 | 10/2014 | Gong et al. | |
| 2014/0362246 A1* | 12/2014 | Nakano | H04N 5/247 348/211.4 |
| 2016/0014311 A1* | 1/2016 | Feltham | H04N 5/073 348/371 |
| 2016/0077422 A1 | 3/2016 | Wang et al. | |
| 2016/0142604 A1* | 5/2016 | Gouji | H05B 37/02 348/211.2 |

(Continued)

FOREIGN PATENT DOCUMENTS

KR    1020130092522 A    8/2013

OTHER PUBLICATIONS

International Search Report and Written Opinion for International Patent Application No. PCT/US2017/019076, dated Jun. 5, 2017.

(Continued)

*Primary Examiner* — Twyler L Haskins
*Assistant Examiner* — Carramah J Quiett
(74) *Attorney, Agent, or Firm* — Jordan IP Law, LLC (57) ABSTRACT

Systems, apparatuses and methods for conducting collaborative sessions between mobile devices may provide for identifying the external mobile devices within a predetermined range of a local mobile device. One or more of the identified external mobile devices may be selected to provide an enhanced flash performance to an internal flash of the local mobile device. In response to receiving and detecting an optical transmission or a wireless transmission from the local mobile device, the flash device of the one or more external devices may be activated to generate a flash that is synchronized with the capture of an image by the local mobile device.

23 Claims, 5 Drawing Sheets

(56) References Cited

U.S. PATENT DOCUMENTS

2016/0219201 A1* 7/2016 Falk .................... H04N 5/2256

OTHER PUBLICATIONS

Lumopro, "LP180R Off Camera Flash" https://lumopro.com/lp180r-off-camera-flash.html, 2016, 5 pages.
International Preliminary Report on Patentability for International Patent Application No. PCT/US2017/019076, dated Apr. 30, 2018, 11 pages.

* cited by examiner

SYSTEM TO SYNCHRONIZE FLASHES BETWEEN MOBILE DEVICES

BACKGROUND

Technical Field

Embodiments generally relate to the synchronization of camera flashes between mobile devices. More particularly, embodiments relate to a system that synchronizes an internal flash of a primary mobile device with the flash of one or more external mobile devices located within a proximate distance of the primary mobile device.

Discussion

In recent years, there has been a substantial increase in the use of mobile communication devices such as smartphones, which may include a camera and an integrated flash, to capture images.

The challenge, when using the cameras of the mobile devices in conditions where the lighting conditions are less than ideal, is that the internal flash of the mobile device may not be sufficient to adequately illuminate and capture certain image environments. Issues related to image backlighting, fill lighting, and overall lack of flash power greatly limit the range of photographs that may be taken with the mobile device.

Supplemental flash devices such as radio controlled or optically triggered flash guns have been developed to provide additional lighting for photographic purposes. These devices, however, may include undesirable characteristics. Some supplemental flash devices may be bulky and expensive, and draw power from the camera device to which they attach, reducing the battery life of the camera device. Other flash devices may not be in communication with the camera device, so the flash is turned on and remains on until the image is captured, thus draining battery life at a high rate. In addition, many flash devices may be configured to function with a single camera device model or form factor, and cannot function with other camera devices or later releases of the same device. Accordingly, there remains considerable room for improvement with respect to acquiring adequate lighting conditions when capturing images.

BRIEF DESCRIPTION OF THE DRAWINGS

The various advantages of the embodiments of the present invention will become apparent to one skilled in the art by reading the following specification and appended claims, and by referencing the following drawings, in which:

DETAILED DESCRIPTION OF EXEMPLARY EMBODIMENTS

Photographers may utilize separate flash units to provide additional lighting when capturing an image. While this arrangement may provide adequate lighting, these devices are typically expensive, bulky, and too complex for the average mobile device user. Accordingly, images taken by the mobile devices are often inferior to those produced by single-lens reflex (SLR) cameras when the lighting conditions are less than ideal.

Figure 1A:
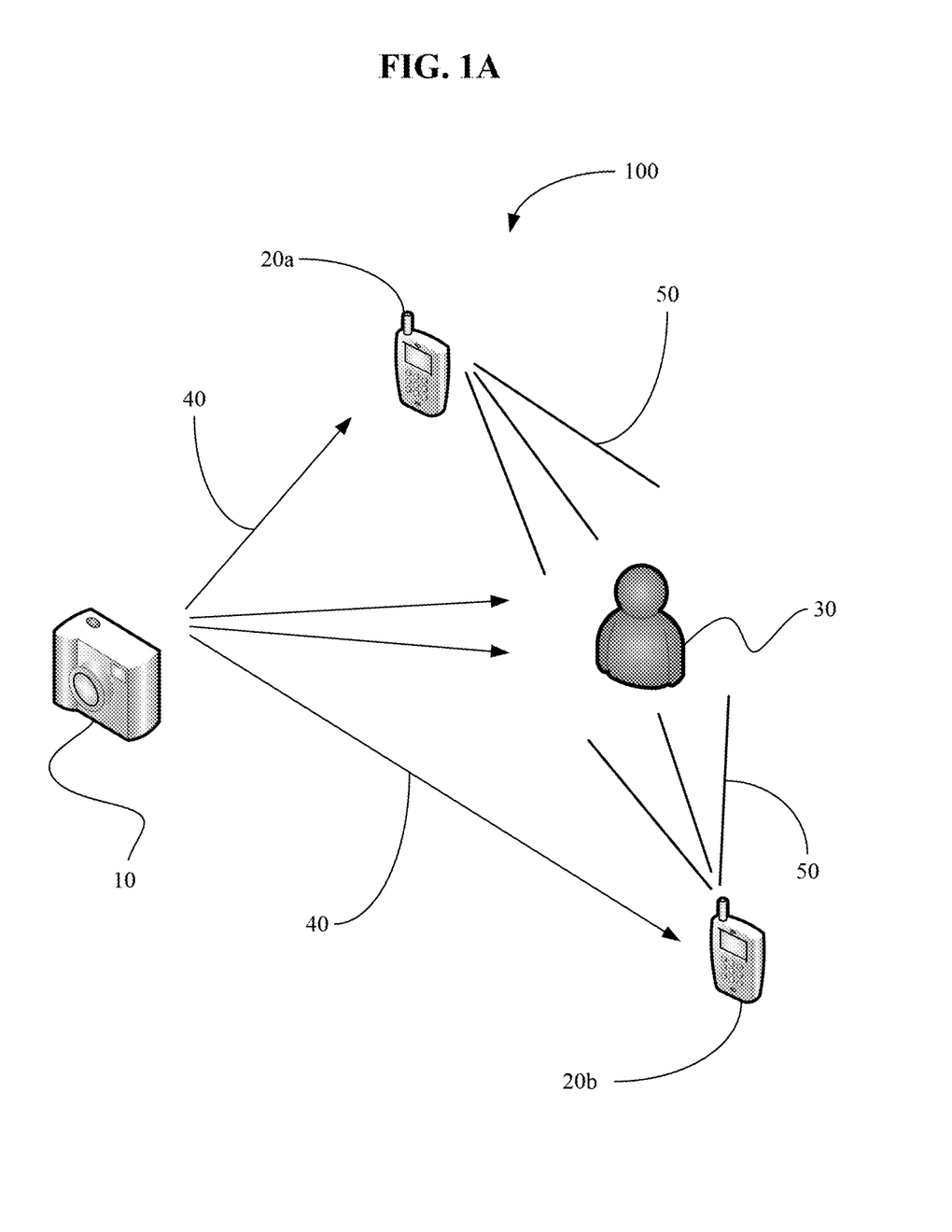
FIG. 1A is a block diagram of an example of a collaborative image capture environment according to an embodiment.

Turning now to FIG. 1A, an environment 100 is shown, in which a camera device 10 participates in a collaborative manner with one or more external mobile devices 20a, 20b in order to facilitate additional illumination around a subject 30 to be captured in an image. In the illustrated environment 100, the one or more external mobile devices 20a, 20b participate in a collaboration session with the camera device 10 in which a command may be executed across each of the external mobile devices 20a, 20b at the same moment in time. The command may be a command to trigger a flash in each of the external mobile devices 20a, 20b. Although only two external mobile devices 20a, 20b are illustrated, this is exemplary. Any number of external mobile devices may be used. The external mobile devices 20a, 20b may each include a camera and an internal flash device. The camera device 10 may be a stand-alone camera or a smartphone, but is not limited thereto.

In the illustrated example, the camera device 10 may manage the collaboration session between itself, a first external mobile device 20a, and a second external mobile device 20b. The first and second external mobile devices 20a, 20n may be considered "remote" from the perspective of the camera device 10 even though all three devices are in the same vicinity, so long as they reside on different platforms.

In response to receiving or detecting an optical transmission 40 from the camera device 10, the external mobile devices 20a, 20b may activate a flash component that is incorporated in each external mobile devices 20a, 20b such as to generate a flash 50 that is synchronized with the capture of the subject 30 by the camera device 10.

According to an exemplary embodiment, the external mobile devices 20a, 20b may include one or more light emitting arrays, such as a Light Emitting Diode (LED). The external mobile devices may provide greater flash illumination than the internal camera flash of the camera device 10 by providing a plurality of light emitting arrays. Greater illumination may be desirable for taking pictures in low light conditions.

The illustrated camera device 10 and the mobile devices 20a, 20b may obtain a software application from a network source (not shown) that facilitates the synchronization of the flash components among the camera device and the external mobile devices 20a, 20b. The software application allows multiple external mobile devices 20a, 20b to act as "smart" slave flash components in conjunction with a main mobile device or traditional camera by controlling the external mobile devices to be triggered optically. For example, the flash 50 of the camera on the external mobile devices 20a, 20b would trigger when it detects (e.g., "sees") a flash 40 of the camera device 10. Alternately, the flash component on the external mobile devices 20a, 20b may be controlled in a wireless manner, for example, via a Bluetooth device.

The external mobile devices 20a, 20b may include a microprocessor configured to interpret an optical transmission from the internal camera flash component of the camera device 10 and apply settings for the external mobile device 20a, 20b in response to the transmission. The camera device 10 may include a software application configured to effect communications with the external mobile devices 20a, 20b by way of optical signals emitted from the internal camera flash component of the camera device 10 in order to produce desired external flash settings that are received and processed by the external mobile devices 20a, 20b. For example, the flash settings may be indicated by a number of flashes, a length of flash, and a sequence of the camera flash emissions to cause a particular optical emission by the external mobile devices 20a, 20b.

When activated, the software application that is installed on the external mobile devices 20a, 20b may control the external mobile devices 20a, 20b to sense the flash 40 from the camera device 10 and trigger their individual flashes 50 in response to the sensed flash 40. The external mobile devices 20a, 20b may also include a user-controlled setting to ignore pre-flashes, (e.g., for red-eye reduction or for autofocus purposes), and may also have a user setting to manually adjust a power setting for the individual flash components of the external mobile devices 20a, 20b. The user of the camera device 10 may take a photo with the flash 40 enabled, and that flash 40 may trigger the external mobile devices to flash.

Figure 1B:
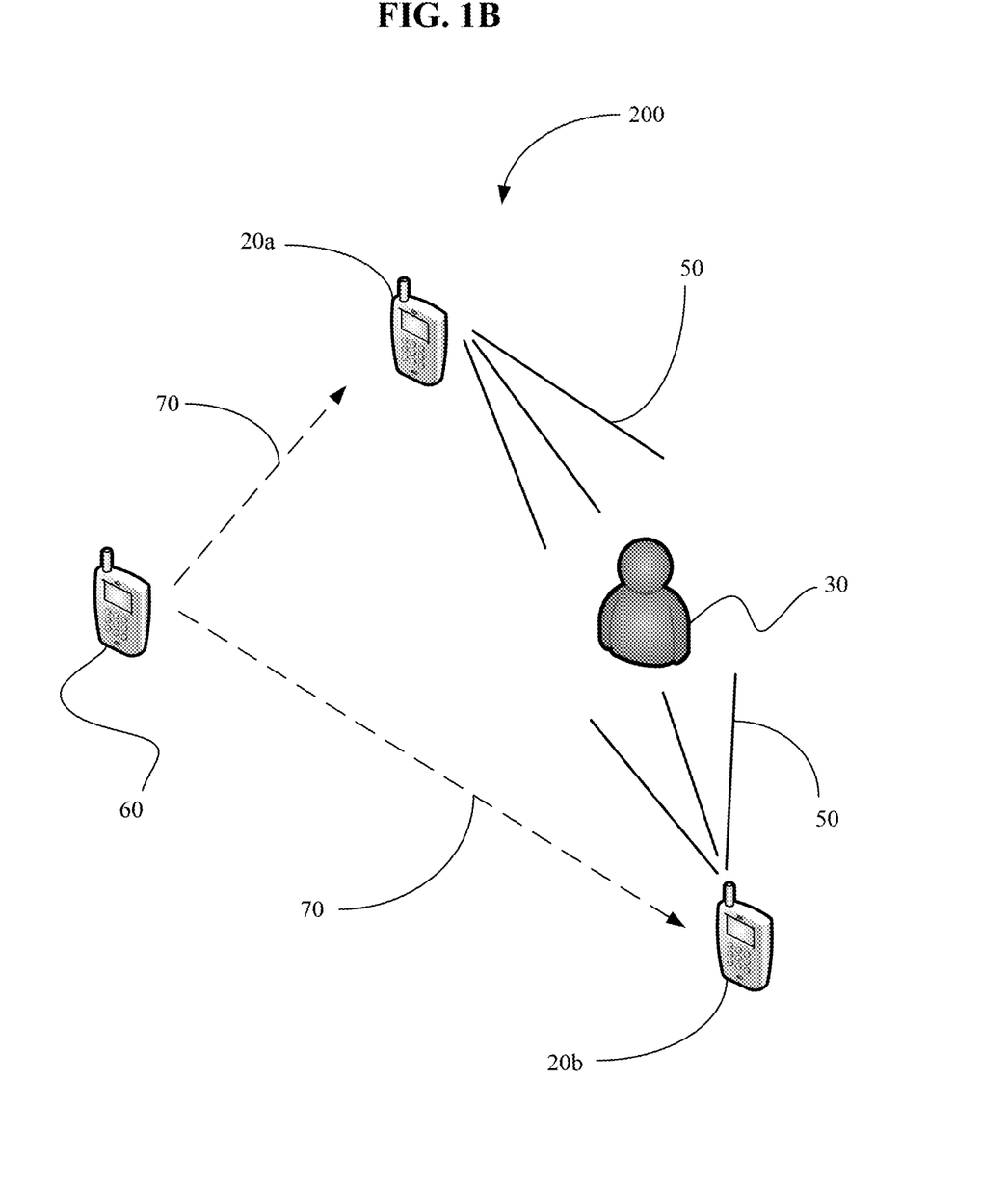
FIG. 1B is a block diagram of another example of a collaborative image capture environment according to an embodiment.

Turning now to FIG. 1B, an environment 200 is shown, in which a smartphone 60 participates in a collaborative manner with the one or more external mobile devices 20a, 20b in order to facilitate additional illumination around the subject 30 to be captured in an image. According to an exemplary embodiment, the smartphone 60 identifies all external mobile devices within a predetermined range of the smartphone 60. The identified external mobile devices may be displayed on a user interface of the smartphone 60, and the user may select one or more of the identified devices. Upon selection of the one or more external mobile device 20a, 20b, and activation of the software application on each of the selected devices, the user of the smartphone 60 may remotely control the flash settings of the external mobile devices 20a, 20b. Alternately, the flash settings of the external mobile devices 20a, 20b may be automatically set upon activation of the software application, or the user of smartphone 60 may request that the users of the external mobile devices 20a, 20b manually control the flash settings based on recommendations from the smartphone 60.

In FIG. 1B, the smartphone 60 may communicate with the external mobile devices 20a, 20b in an optical manner or wirelessly via a Bluetooth interface. A software application may facilitate the communication between the smartphone 60 and the external mobile devices 20a, 20b. The smartphone 60 and the external mobile devices 20a, 20b may each download the software application from a network source (not shown), and install the software application. Alternately, the smartphone 60 may download and install the software application, and then push the software application to selected external mobile devices 20a, 20b that have opted to allow their flash components to be triggered by the smartphone 60.

The use of Bluetooth communication may trigger the external mobile devices 20a, 20b to activate their individual flash components. The Bluetooth connection may also allow automatic control of power and any other characteristics of the external mobile devices 20a, 20b by the smart phone 60, and allow the communication of set-up and feedback information to and from the external mobile devices 20a, 20b. The software application might allow the smartphone 60 to take an initial photograph, analyze the image of the subject 30 and then suggest better placement of the external mobile devices 20a, 20b. The smartphone 60 may also automatically send flash adjustments, such as flash power level adjustments, to the external mobile devices 20a, 20b based on the initial photograph to improve the quality of subsequent photographs.

According to another exemplary embodiment, upon activation of the software application, the external mobile devices 20a, 20b may automatically suspend the operation of their individual flash components for a predetermined time period in order to prevent the triggering of an inadvertent flash by the external mobile devices prior to the capturing of an image 30 by the smartphone 60.

A setting to ignore pre-flashes from the smartphone 60, (e.g., for red-eye reduction or for autofocus purposes), may be communicated from the smartphone 60 to the external mobile devices 20a, 20b based on the setting of the smartphone 60. The user may capture an image of the subject 30 using the smartphone 60, which may then trigger the external mobile devices 20a, 20b to flash. The smartphone 60 may then display the image to the user, and a query may be displayed requesting confirmation that the captured image is satisfactory. If the user is not satisfied with the quality of the captured image, alternative flash placement options may be displayed on the user interface of the smartphone 60. Alternately, the power of the flash components of the external mobile devices 20a, 20b may be automatically adjusted based on the image characteristics of the captured image (e.g., the captured image is over exposed, underexposed, etc.), as well as on the basis of user feedback (e.g., the shadows of the captured image are too dark, etc.). The external mobile devices 20a, 20b may use camera focus information to provide details back to the smartphone 60 with regard to the distances between the smartphone 60 and the external mobile devices 20a, 20b and convey suggestions to the smartphone 60 with regard to the amount that distances between the smartphone 60 and the external mobile devices may be adjusted.

Figure 2:
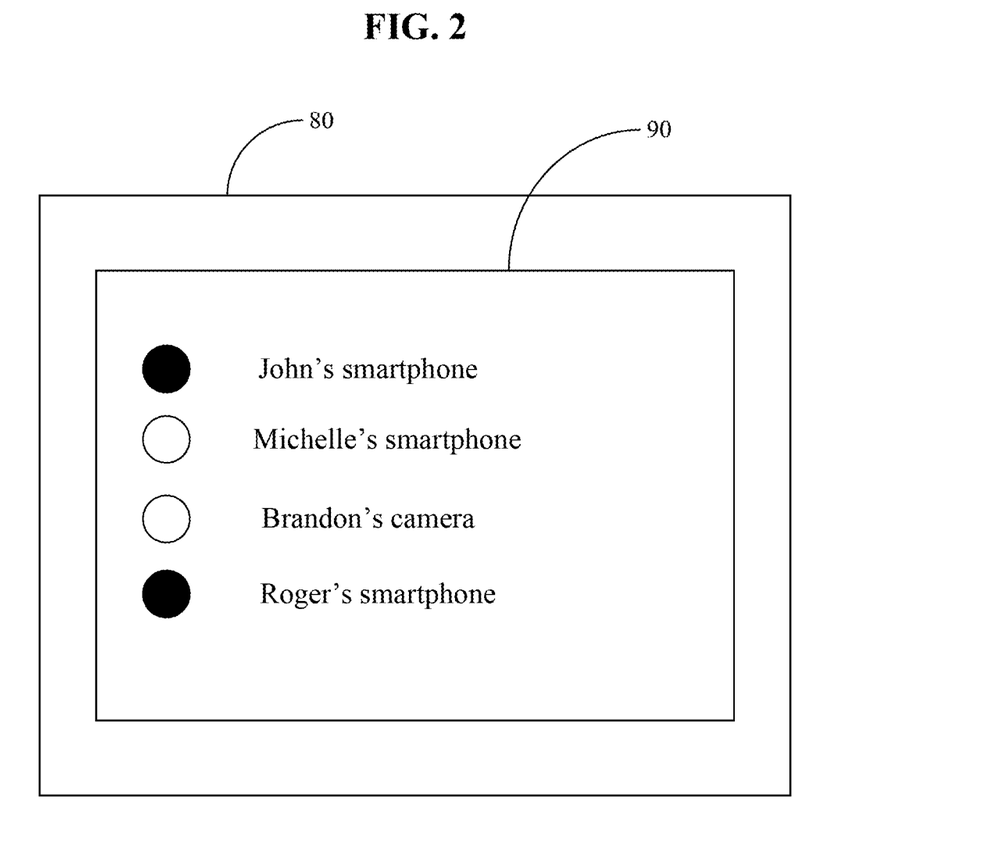
FIG. 2 is a screenshot of an example of a selection device according to an embodiment.

Turning now to FIG. 2, a user interface (UI) 90 (e.g., selection device) of a mobile device 80 according to an exemplary embodiment is illustrated, wherein the UI 90 may be visually presented on a display having touch screen functionality. In the illustrated example, external mobile devices that are within a predetermined range of the mobile device 80 are displayed to a user in the UI 90. For example, "John's smartphone", "Michelle's smartphone", "Brandon's camera", and "Roger's smartphone" are located within a predetermined range of the mobile device 80, and therefore are displayed to the user in the illustrated example. The user may select one or more identified devices (e.g., "John's smartphone" and "Roger's smartphone") that are located in close proximity to an image 30 to be photographed to act as external flash devices.

Figure 3:
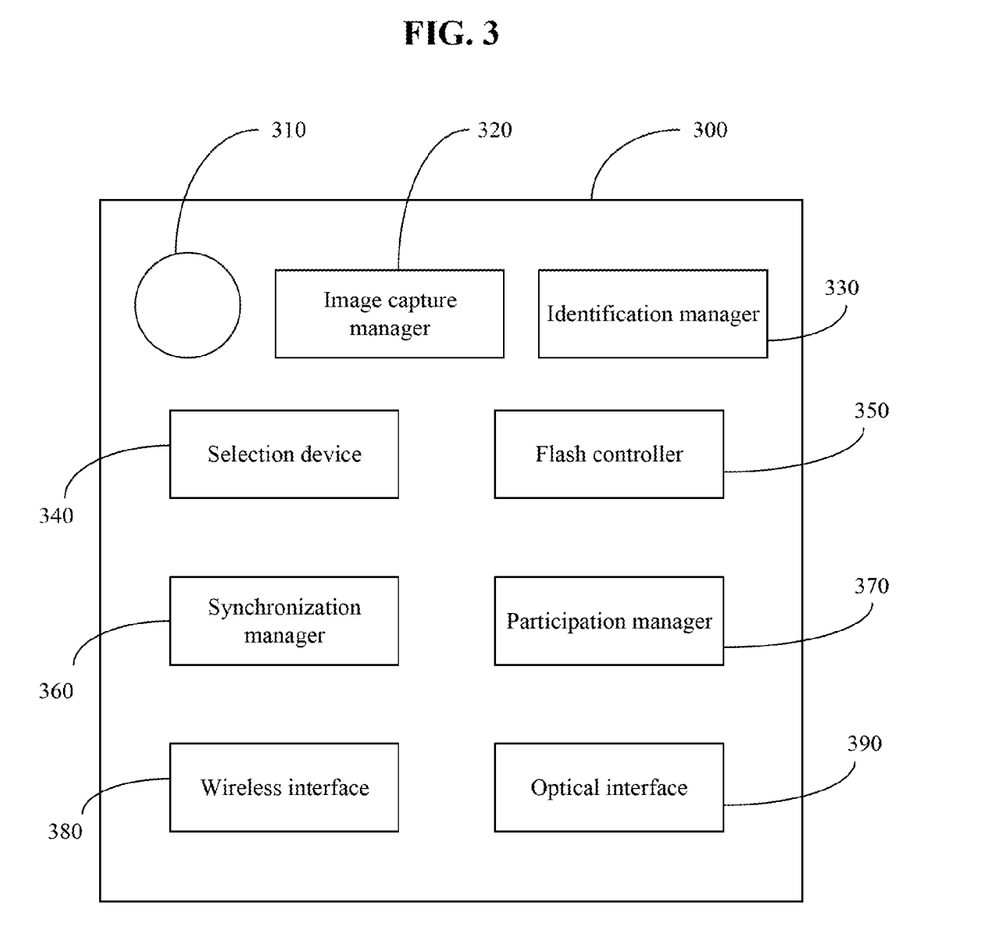
FIG. 3 is a block diagram of an example of a device according to an embodiment.

FIG. 3 shows an example of a mobile device 300. The mobile device 300 may be implemented as a camera, a personal data assistant (PDA), a cellular phone with an integrated camera, or a portable computer with an integrated camera, but is not limited thereto. If the mobile device 300 functions as a managing device such as, for example, the camera 10 (FIG. 1A) or the smartphone 60 (FIG. 1B), in a collaborative session, control logic may be operable to identify external mobile devices in a predetermined range of the mobile device 300, select one or more of the identified external mobile devices, and transmit a control message to one or more selected external mobile devices via a wireless (e.g., Wi-Fi, Bluetooth) interface 380, or an optical interface 390. The wireless interface 380 may be connected to an antenna (not shown), and implements wireless data transfer. The optical interface 390 may be connected to a bus (not shown), and may, in response to receiving and detecting an optical transmission, activate one or more light emitting diodes (LEDs) to generate a flash that is synchronized with the capture of a subject in an image by an external camera. The optical interface 390 may be implemented as a photodiode, CCD, CMOS, or other silicone die optical element, but is not limited thereto.

If, on the other hand, the mobile device 300 functions as a participating mobile device in a collaborative session, the control logic may be operable to receive a control message from a remote managing device via the wireless interface 380 or the optical interface 390.

The illustrated mobile device 300 also includes a flash component 310. The flash component 310 may be displaced with respect to the housing of the mobile device 300. For example, the flash component 310 may extend from a storage position in the housing of the mobile device 300 to a use position that extends from the housing of the mobile device 300 to provide better illumination. The flash component 310 may include a driver (not shown) and one or more light emitting units such as the LEDs, xenon tubes, or other light sources. The flash component 310 may be configured to transmit light with various properties, such as brightness level, color temperature, and viewing angle, and may receive control signals from a flash controller 350, and illuminate an object to be captured in low light situations. The flash component 310 may be implemented as the flash device of a camera, the internal flash of a mobile device such as a mobile phone, the illuminated screen of a mobile device such as a PDA, but is not limited thereto.

The flash controller 350 may control one or more of a flash setting or a flash placement of a selected one or more external mobile devices. The flash controller may be connected via a bus (not shown) to the flash component 310 and the image capture manager 320, and may initiate the capture of at least one image frame by the image capture manager 320, and the activation of the flash component 310.

The image capture manager 320 may be configured as a controller, which is configured to execute instructions, such as instructions to activate the flash component 310 in response to detecting an optical transmission from an external device. The image capture manager 320 may be implemented as a microprocessor having system-level control to perform various computations, functions and other processes related to the mobile device 300. The image capture manager 320 may facilitate execution of image capture commands such as shutter, focus and flash commands.

The illustrated mobile device 300 may also include an identification manager 330, coupled to the internal bus (not shown), to identify external mobile devices within a predetermined range of the mobile device 300, and a user interface (UI) 340 (e.g., selection device) that enables a user to interact with and perceive information from the mobile device 300. The UI 340 may include a plurality of keys such as alphanumeric keys, or may be a touch controlled screen. Alternately, the UI 340 may include a joy-stick element or roller-ball implementation, but is not limited thereto. Thus, the UI 340 may include functionality similar to that of the UI 90 (FIG. 2), already discussed, and may enable the user to select participating mobile devices for the collaborative session. The mobile device 300 may also include a synchronization manager 360, connected to the bus (not shown), to synchronize a flash trigger of the mobile device 300 with a flash trigger of the selected one or more external mobile devices, and a participation manager 370, also connected to the bus (not shown), to send an opt-in request to the selected one or more external mobile devices to establish a connection with the selected one or more external mobile devices.

The illustrated components of the mobile device 300 may be implemented in logic instructions, configurable logic, fixed-functionality logic hardware, etc., or any combination thereof. Moreover, the mobile device 300 may also include RAM (not shown), ROM (not shown), and flash memory (not shown), etc. to store images, videos, device profiles, authentication data, device statuses, control logic instructions, etc.

Figure 4:
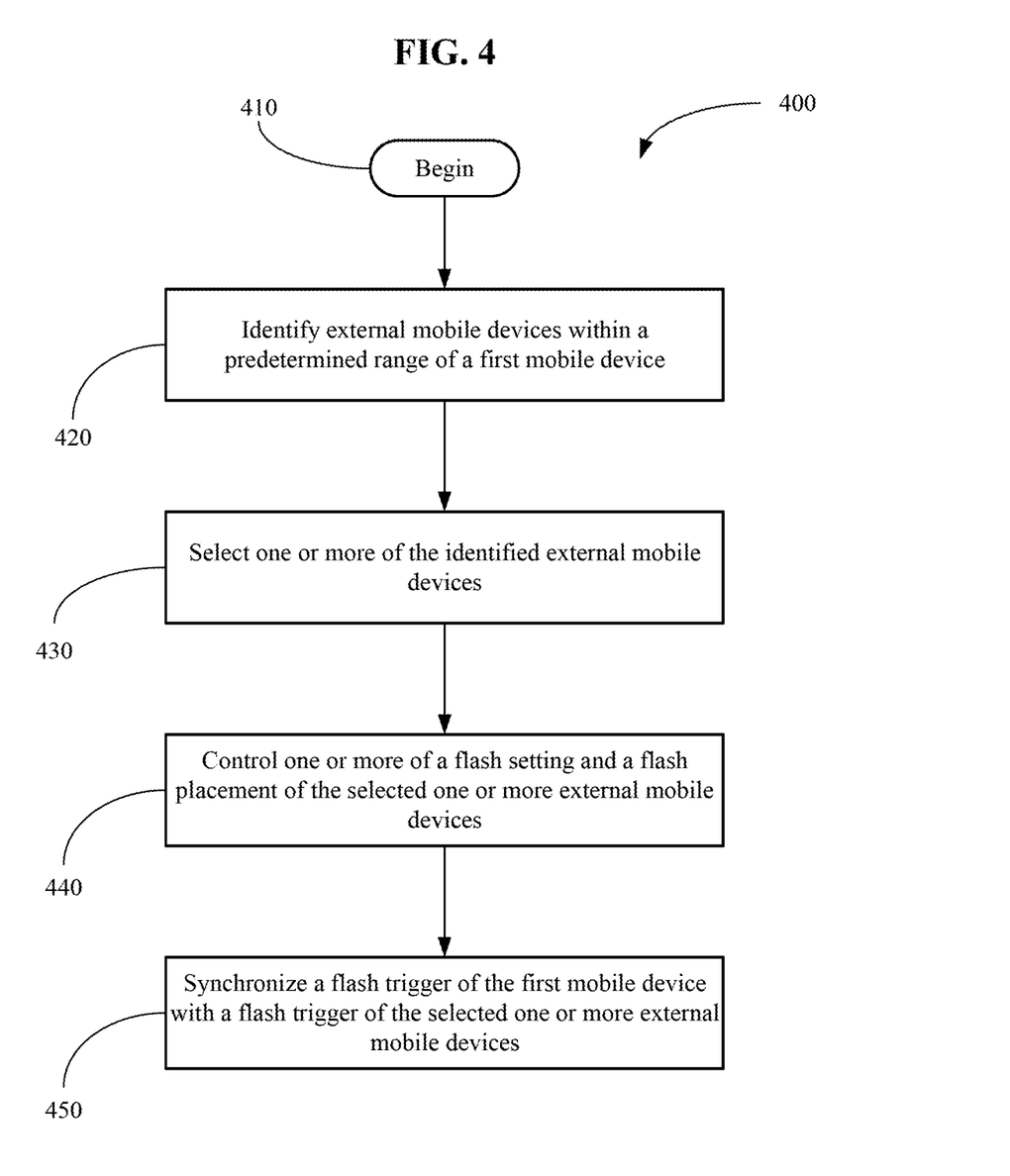
FIG. 4 is a flowchart of an example of a method of synchronizing flashes between mobile devices according to an embodiment.

Turning now to FIG. 4, a method 400 of managing a mobile device collaborative session is shown. The method 400 may generally be implemented in a mobile device such as, for example, the local mobile device 10 (FIG. 1) or the local mobile device 60 (FIG. 1), already discussed. More particularly, the method 400 may be implemented as a set of logic instructions stored in a machine- or computer-readable medium of a memory such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality logic hardware using circuit technology such as application specific integrated circuit (ASIC), complementary metal oxide semiconductor (CMOS) or transistor-transistor logic (TTL) technology, or any combination thereof. For example, computer program code to carry out operations shown in method 400 may be written in any combination of one or more programming languages, including an object oriented programming language such as JAVA, SMALLTALK, C++ or the like and conventional procedural programming languages, such as the "C" programming language or similar programming languages.

The illustrated method 400 begins at block 410. In processing block 420, a local managing device such as a camera and/or smartphone may identify external mobile devices that are within a predetermined range of the local mobile device. In particular, block 420 may involve detecting the presence of available mobile devices via their respective wireless network controllers. The wireless network controllers may include, for example, Wi-Fi (e.g., IEEE 802.11, 1999 Edition, LAN/WAN Wireless LANS) and/or Bluetooth (e.g., IEEE 802.15.1-2005, Wireless Personal Area Networks) functionality.

In processing block 430, device identifiers of the available mobile devices may be output via a selection device or UI along with a user prompt for a selection of one or more devices from the identifiers. Upon receipt of the selection input from the user, a set of participating mobile devices may be identified.

For example, FIG. 2 shows a mobile device 80 having a selection device or UI 90. In the illustrated example, the status of each device is indicated by a solid dot next to the device identifier. A solid dot may represent that the device has been selected to participate in a collaborative flash session. Thus, in the illustrated example, "John's smartphone" and "Roger's smartphone" have been selected to participate in the collaborative session and "Michelle's smartphone" and "Brandon's camera" have not been selected.

Returning to FIG. 4, once the participating devices have been identified and selected, a connection may be set up between the local managing device and each of the selected external mobile devices. For example, block 430 may involve prompting the user to identify what type of connection is preferred. For example, if the selected external mobile devices are trusted, and do not require authentication, the user may choose an open connection. On the other hand, if the selected external mobile devices are not trusted, the user may choose a secure connection, which includes carrying out an authentication process before the connection is setup and ready to use. Block 430 may also involve requesting that the selected external mobile devices opt-in to participate in the collaborative session.

Upon selection of the one or more external mobile devices, the local managing device may control one or more of a flash setting and a flash placement of the selected external mobile device(s) in illustrated block 440. In processing block 450, a flash trigger of the local managing device is synchronized with a flash trigger of the selected one or more external mobile devices.

ADDITIONAL NOTES AND EXAMPLES

Example 1 may include a mobile device to collaborate a flash operation, comprising a flash component, an image capture manager to capture an image of an object, an identification manager to identify one or more external mobile devices within a predetermined range of the mobile device, a selection device to select one or more of the identified external mobile devices, a flash controller to control one or more of a flash setting or a flash placement of the selected one or more external mobile devices, and a synchronization manager to synchronize a flash trigger of the mobile device with a flash trigger of the selected one or more external mobile devices, wherein the mobile device and the one or more external mobile devices are one or more of a camera or a smart phone.

Example 2 may include the device of example 1, further including a participation manager to send an opt-in request to the selected one or more external mobile devices to establish a connection with the selected one or more external mobile devices.

Example 3 may include the device of any one of examples 1 or 2, wherein the flash setting is to control one or more of a flash power level and a pre flash of the selected one or more external mobile devices.

Example 4 may include the device of example 3, wherein the image capture manager is to adjust one or more of the flash power level and the flash placement based on the captured image.

Example 5 may include the device of example 1, further comprising a wireless interface to transmit commands to trigger the flash of the one or more external mobile devices.

Example 6 may include the device of example 5, wherein the wireless interface is to transmit information to the selected one or more external mobile devices, and receive feedback information from the selected one or more external mobile devices.

Example 7 may include an apparatus to collaborate a flash operation, comprising: an image capture manager to capture a first image of an object, an identification manager to identify one or more external mobile devices within a predetermined range of the apparatus, a selection device to select one or more of the identified external mobile devices, a flash controller to control one or more of a flash setting or a flash placement of the selected one or more external mobile devices, and a synchronization component to synchronize a flash trigger of the apparatus with a flash trigger of the selected one or more external mobile devices.

Example 8 may include the apparatus of example 7, wherein a participation manager is to send an opt-in request to the selected one or more external mobile devices to establish a connection with the selected one or more external mobile devices.

Example 9 may include the apparatus of any one of examples 7 or 8, wherein the flash setting is to specify one or more of a flash power level or a pre-flash of the selected one or more external mobile devices.

Example 10 may include the apparatus of example 9, wherein the image capture manager is to adjust one or more of the flash power level or the flash placement based on the captured first image.

Example 11 may include the apparatus of example 7, further comprising a wireless interface to transmit commands to trigger the flash of the selected one or more external mobile devices.

Example 12 may include the apparatus of example 11, wherein the wireless interface is to transmit information to the selected one or more external mobile devices and receive feedback information from the selected one or more external mobile devices.

Example 13 may include a method of collaborating a flash operation, comprising: identifying external mobile devices within a predetermined range of a first mobile device, selecting one or more of the identified external mobile devices, controlling one or more of a flash setting or a flash placement of the selected one or more external mobile devices, and synchronizing a flash trigger of the first mobile device with a flash trigger of the selected one or more external mobile devices.

Example 14 may include the method of example 13, further comprising sending an opt-in request to the selected one or more external mobile devices to establish a connection with the selected one or more external mobile devices.

Example 15 may include the method of any one of examples 13 or 14, wherein the flash setting controls one or more of a flash power level and a pre flash of the selected one or more external mobile devices.

Example 16 may include the method of example 15, further comprising: capturing a first image of an object, and adjusting one or more of the flash power level and the flash placement based on the captured first image.

Example 17 may include the method of example 13, further comprising transmitting commands to trigger the flash of the selected one or more external mobile devices.

Example 18 may include the method of example 17, further including: transmitting, by a wireless interface, information to the selected one or more external mobile devices, and receiving feedback information from the selected one or more external mobile devices.

Example 19 may include at least one computer readable storage medium comprising a set of instructions, which when executed by an apparatus, cause the apparatus to: identify external mobile devices within a predetermined range of a first mobile device, select one or more of the identified external mobile devices, control one or more of a flash setting or a flash placement of the selected one or more external mobile devices, and synchronize a flash trigger of the first mobile device with a flash trigger of the selected one or more external mobile devices.

Example 20 may include the at least one computer readable storage medium of example 19, wherein the instructions, when executed, cause the first mobile device to send an opt-in request to the selected one or more external mobile devices to establish a connection with the selected one or more external mobile devices.

Example 21 may include the at least one computer readable storage medium of any one of examples 19 or 20, wherein the flash setting is to control one or more of a flash power level and a pre flash of the selected one or more external mobile devices.

Example 22 may include the at least one computer readable storage medium of example 21, further comprising capturing a first image of an object, and adjusting one or more of the flash power level and the flash placement based on the captured first image.

Example 23 may include the at least one computer readable storage medium of example 19, further comprising a wireless interface to transmit commands to trigger the flash of the selected one or more external mobile devices.

Example 24 may include the at least one computer readable storage medium of example 23, wherein the wireless interface is to transmit information to the selected one or more external mobile devices, and receive feedback information from the selected one or more external mobile devices.

Example 25 may include an apparatus to collaborate a flash operation, comprising: means for identifying external mobile devices within a predetermined range of a first mobile device, means for selecting one or more of the identified external mobile devices, means for controlling one or more of a flash setting or a flash placement of the selected one or more external mobile devices, and means for synchronizing a flash trigger of the first mobile device with a flash trigger of the selected one or more external mobile devices.

Example 26 may include the apparatus of example 25, further comprising means for sending an opt-in request to the selected one or more external mobile devices to establish a connection with the selected one or more external mobile devices.

Example 27 may include the apparatus of any one of examples 25 or 26, further comprising means for controlling one or more of a flash power level and a pre flash of the selected one or more external mobile devices.

Example 28 may include the apparatus of example 27, further comprising: means for capturing a first image of an object, and means for adjusting one or more of the flash power level and the flash placement based on the captured first image.

Example 29 may include the apparatus of example 25, further comprising means for transmitting commands to trigger the flash of the selected one or more external mobile devices.

Example 30 may include the apparatus of example 29, further including: means for transmitting, by a wireless interface, information to the selected one or more external mobile devices, and means for receiving feedback information from the selected one or more external mobile devices.

Embodiments described herein are applicable for use with all types of semiconductor integrated circuit ("IC") chips. Examples of these IC chips include but are not limited to processors, controllers, chipset components, programmable logic arrays (PLAs), memory chips, network chips, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A mobile device comprising:
   a flash component;
   an image capture manager to capture an image of an object;
   an identification manager to identify one or more external mobile devices within a predetermined range of the mobile device;
   a selection device to select one or more of the identified one or more external mobile devices;
   a flash controller to control one or more of a flash setting or a flash placement of the selected one or more external mobile devices; and
   a synchronization manager to synchronize a flash trigger of the mobile device with a flash trigger of the selected one or more external mobile devices, wherein the flash trigger of the selected one or more external mobile devices is to cause a flash by the selected one or more external mobile devices in response to an identification, by the selected one or more external mobile devices, of a flash of the mobile device;
   wherein the mobile device and the one or more external mobile devices are one or more of a camera or a smart phone, and wherein the synchronization manager is to provide a command to the selected one or more external mobile devices to suspend operation of individual flash components of the selected one or more external mobile devices to ignore one or more flashes by the mobile device to prevent the flash trigger of the selected one or more external mobile devices from causing a flash by the selected one or more external mobile devices prior to the capturing of the image of the object by the image capture manager.

2. The device of claim 1, wherein the flash setting is to control one or more of a flash power level and a pre flash of the selected one or more external mobile devices.

3. The device of claim 2, wherein the image capture manager is to adjust one or more of the flash power level and the flash placement based on the captured image.

4. The device of claim 1, further comprising a wireless interface to transmit commands to trigger the flash of the one or more external mobile devices.

5. The device of claim 4, wherein the wireless interface is to transmit information to the selected one or more external mobile devices, and receive feedback information from the selected one or more external mobile devices.

6. An apparatus comprising:
an image capture manager to capture a first image of an object
an identification manager to identify one or more external mobile devices within a predetermined range of the apparatus;
a selection device to select one or more of the identified one or more external mobile devices;
a flash controller to control one or more of a flash setting or a flash placement of the selected one or more external mobile devices; and
a synchronization component to synchronize a flash trigger of the apparatus with a flash trigger of the selected one or more external mobile devices, wherein the flash trigger of the selected one or more external mobile devices is to cause a flash by the selected one or more external mobile devices in response to an identification, by the selected one or more external mobile devices, of a flash of the apparatus,
wherein the synchronization component is to provide a command to the selected one or more external mobile devices to suspend operation of individual flash components of the selected one or more external mobile devices to ignore one or more flashes by the apparatus to prevent the flash trigger of the selected one or more external mobile devices from causing a flash by the selected one or more external mobile devices prior to the capturing of the first image of the object by the image capture manager.

7. The apparatus of claim 6, wherein the flash setting is to specify one or more of a flash power level or a pre-flash of the selected one or more external mobile devices.

8. The apparatus of claim 7, wherein the image capture manager is to adjust one or more of the flash power level or the flash placement based on the captured first image.

9. The apparatus of claim 6, further comprising a wireless interface to transmit commands to trigger the flash of the selected one or more external mobile devices.

10. The apparatus of claim 9, wherein the wireless interface is to transmit information to the selected one or more external mobile devices and receive feedback information from the selected one or more external mobile devices.

11. A method comprising:
identifying external mobile devices within a predetermined range of a first mobile device;
selecting one or more of the identified external mobile devices;
controlling one or more of a flash setting or a flash placement of the selected one or more external mobile devices;
synchronizing a flash trigger of the first mobile device with a flash trigger of the selected one or more external mobile devices, wherein the flash trigger of the selected one or more external mobile devices is to cause a flash by the selected one or more external mobile devices in response to an identification, by the selected one or more external mobile devices, of a flash of the first mobile device; and
sending a command, by the first mobile device, to the selected one or more external mobile devices to suspend operation of individual flash components of the selected one or more external mobile devices to ignore one or more flashes by the first mobile device to prevent the flash trigger of the selected one or more external mobile devices from causing a flash by the selected one or more external mobile devices prior to capturing an image of an object by the first mobile device.

12. The method of claim 11, wherein the flash setting controls one or more of a flash power level and a pre flash of the selected one or more external mobile devices.

13. The method of claim 12, further comprising:
capturing a first image of an object; and
adjusting one or more of the flash power level and the flash placement based on the captured first image.

14. The method of claim 11, further comprising transmitting commands to trigger the flash of the selected one or more external mobile devices.

15. The method of claim 14, further including:
transmitting, by a wireless interface, information to the selected one or more external mobile devices; and
receiving feedback information from the selected one or more external mobile devices.

16. At least one computer readable storage medium comprising a set of instructions, which when executed by an apparatus, cause the apparatus to:
identify external mobile devices within a predetermined range of a first mobile device;
select one or more of the identified external mobile devices;
control one or more of a flash setting or a flash placement of the selected one or more external mobile devices;
synchronize a flash trigger of the first mobile device with a flash trigger of the selected one or more external mobile devices, wherein the flash trigger of the selected one or more external mobile devices is to cause a flash by the selected one or more external mobile devices in response to an identification, by the selected one or more external mobile devices, of a flash of the first mobile device; and
send a suspension command to the selected one or more external mobile devices to suspend operation of individual flash components of the selected one or more external mobile devices to ignore one or more flashes by the first mobile device to prevent the flash trigger of the selected one or more external mobile devices from causing a flash by the selected one or more external mobile devices prior to capturing an image of an object by the first mobile device.

17. The at least one computer readable storage medium of claim 16, wherein the flash setting is to control one or more of a flash power level and a pre flash of the selected one or more external mobile devices.

18. The at least one computer readable storage medium of claim 17, wherein the instructions, when executed, cause the apparatus to:
   capture a first image of an object; and
   adjust one or more of the flash power level and the flash placement based on the captured first image.

19. The at least one computer readable storage medium of claim 16, wherein the instructions, when executed, cause the apparatus to transmit commands to trigger the flash of the selected one or more external mobile devices.

20. The at least one computer readable storage medium of claim 19, wherein the instructions, when executed, cause the apparatus to transmit information to the selected one or more external mobile devices, and receive feedback information from the selected one or more external mobile devices.

21. The at least one computer readable storage medium of claim 19, wherein the suspension command is to be sent through an optical transmission to the selected one or more external mobile devices.

22. The at least one computer readable storage medium of claim 21, wherein one or more of a number of flashes associated with the optical transmission, a length of a flash associated with the optical transmission, or a sequence of flashes associated the optical transmission are to indicate the suspension command.

23. The at least one computer readable storage medium of claim 19, wherein the instructions, when executed, cause the apparatus to establish a secure connection between the first mobile device and the selected one or more external mobile devices.

* * * * *